July 29, 1952 V. H. DISNEY 2,605,340
TELEMETERING SYSTEM
Filed Aug. 8, 1945 5 Sheets-Sheet 2

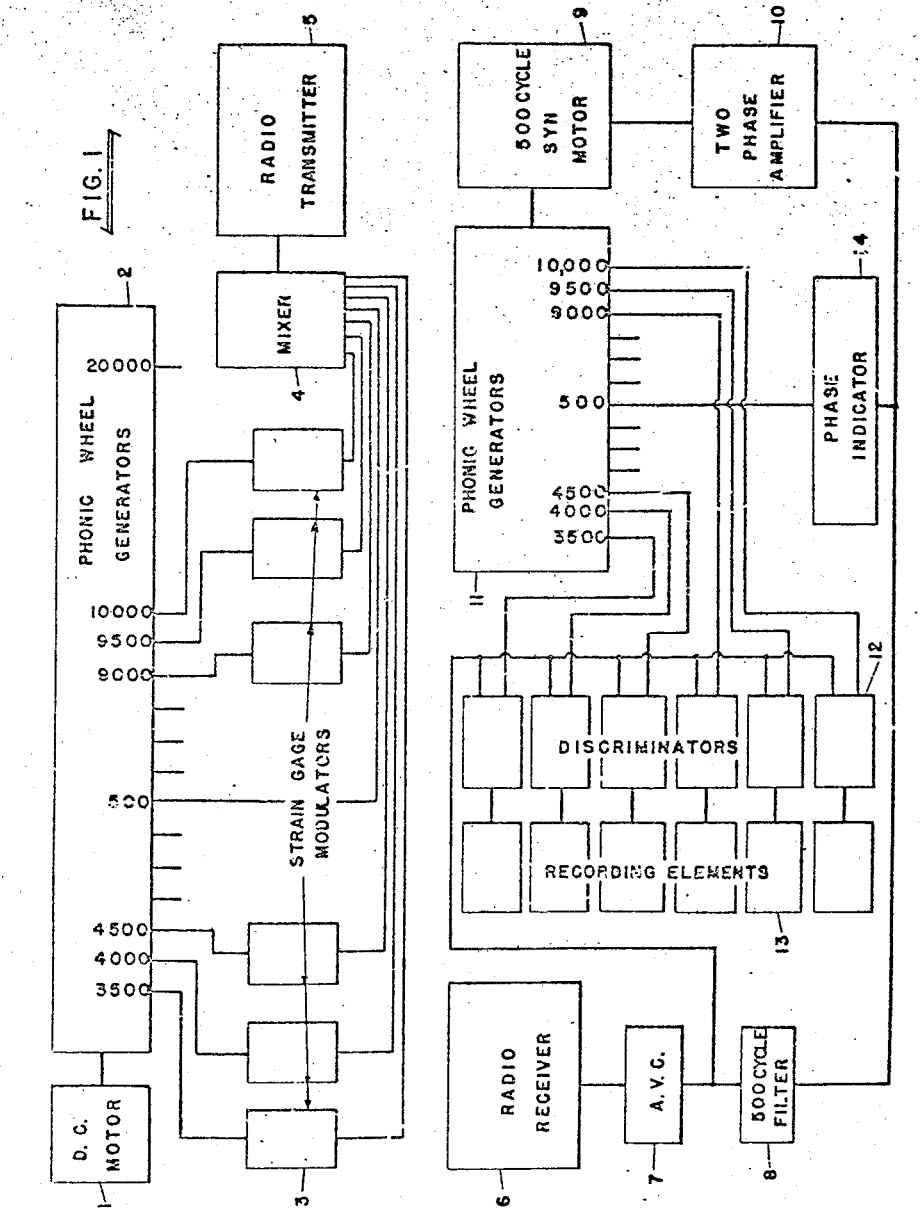

Inventor
VIRGIL H. DISNEY
By Ralph L. Chappell
Attorney

Inventor
VIRGIL H. DISNEY
By Ralph Chappell
Attorney

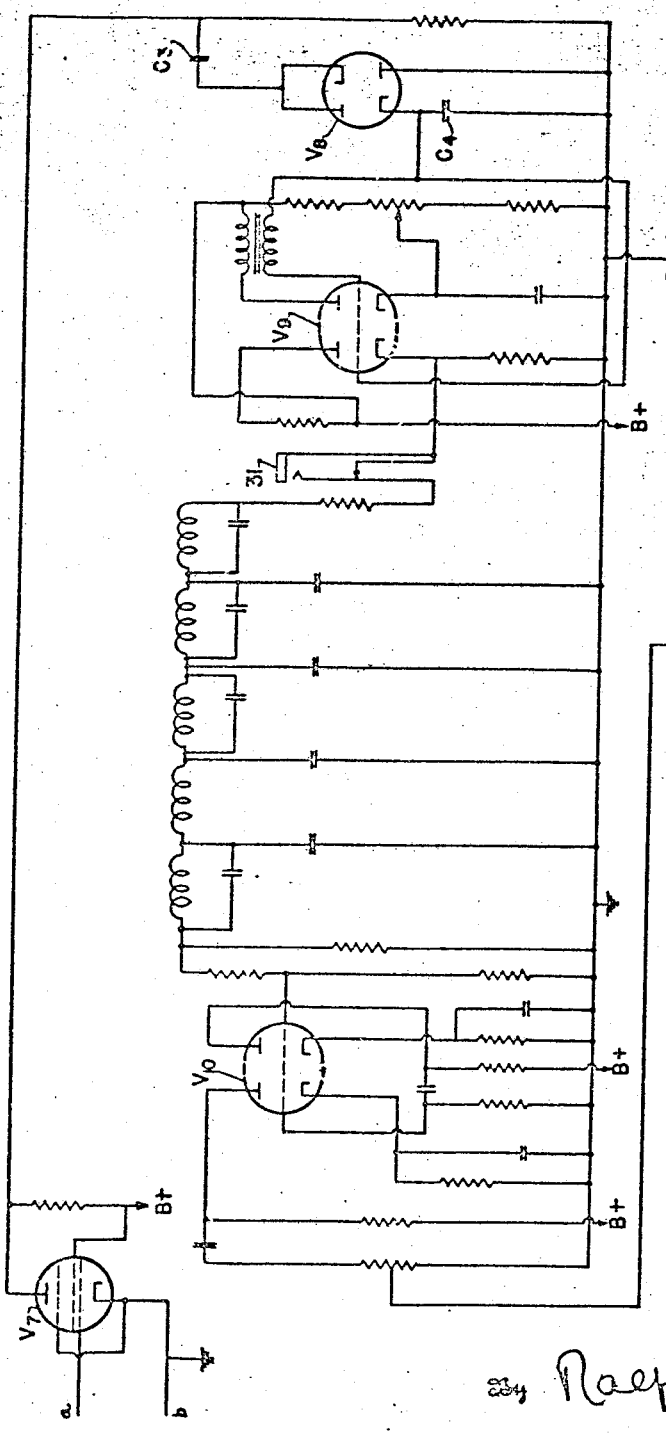

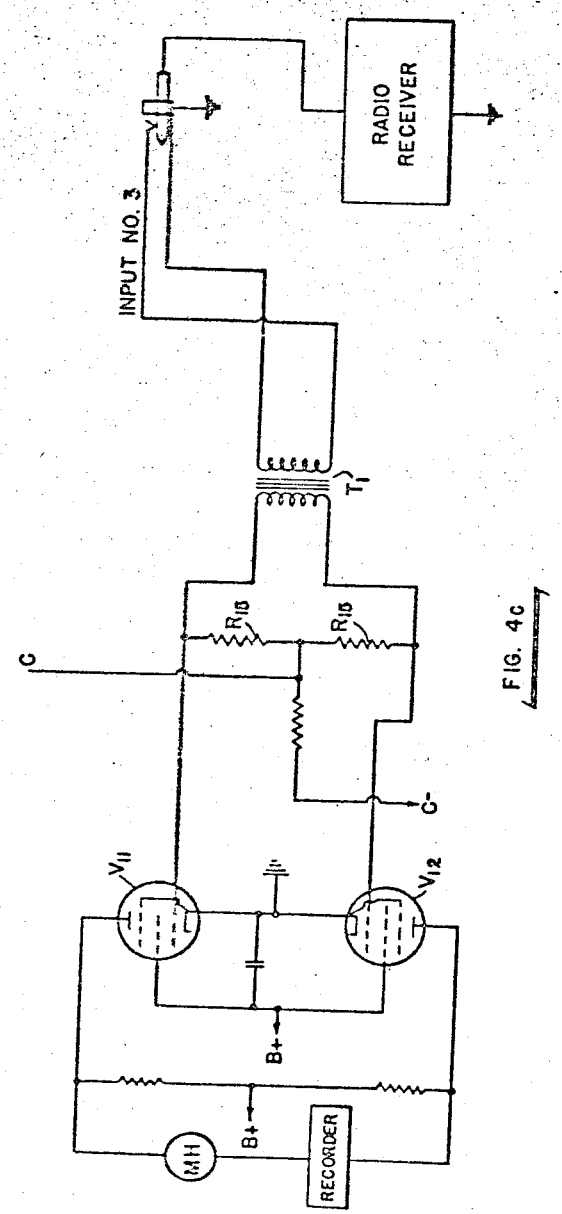

Patented July 29, 1952

2,605,340

UNITED STATES PATENT OFFICE 2,605,340

TELEMETERING SYSTEM

Virgil H. Disney, Elkhart, Ind., assignor to the United States of America as represented by the Secretary of the Navy Application August 8, 1945, Serial No. 609,665

7 Claims. (Cl. 177—351)

This invention relates in general to receiver circuits, and more particularly to a receiver circuit for operation in a multi-channel radio flight test recorder.

In general the apparatus of which this invention is a part, consists of a multi-channel radio transmitter and receiver, so designed that the transmitter may be placed in an airplane to be tested; to transmit to the receiver, on the ground or in another plane, certain test data such as a series of readings of stresses in chosen members and the like.

The purpose of this invention is to develop a receiver for use with a telemetering system which transmits through a number of independent channels from an airplane to ground or to another plane within a radius of approximately fifty miles. Each channel is to be capable of carrying modulation frequencies up to about one hundred cycles per second, such frequencies being obtained from bridge networks containing strain gages or other indicating instruments having similar output characteristics. The receiving equipment is to be capable of receiving the chosen number of independent channels simultaneously, and recording the received information by means of a recording oscillograph or other similar recorder.

A series of high frequency generators are mounted on a common shaft, to generate a series of signals of subcarrier frequencies. Each signal of subcarrier frequency is modulated by a bridge circuit and amplified in a coupling tube. The outputs of the coupling tubes are mixed, amplified and utilized to modulate a radio transmitter.

At the receiving station the present invention consists of a synchronous motor driving a duplicate of the transmitter's series of high frequency generators, each of which energizes one input of an electronic detector or discriminator. The other input of the electronic detector or discriminator is energized from the receiver output. The output of each electronic detector may go through a low pass filter to an oscillograph element, where the modulations imposed on the correspoding frequency at the transmitter are faithfully reproduced.

It is an object of this invention to produce a receiver for use in a telemetering system which transmits through a number of independent channels from an airplane in flight to ground or to another plane.

Another object is to produce an all electronic receiver.

Another object is to produce an electronic receiver that requires no moving parts.

Another object is to produce a receiver in which the subcarrier frequencies are obtained by division of a reference frequency.

Another object is the provision of a system which will be economical to manufacture, reliable in operation and which possesses all of the qualities of ruggedness and dependability in service.

In the drawings:

Figs. 1 and 2 illustrate in block diagram form one embodiment of this invention;

Figs. 4a, 4b, and 4c taken together illustrate a circuit diagram of the receiver of Fig. 3.

Figure 3:
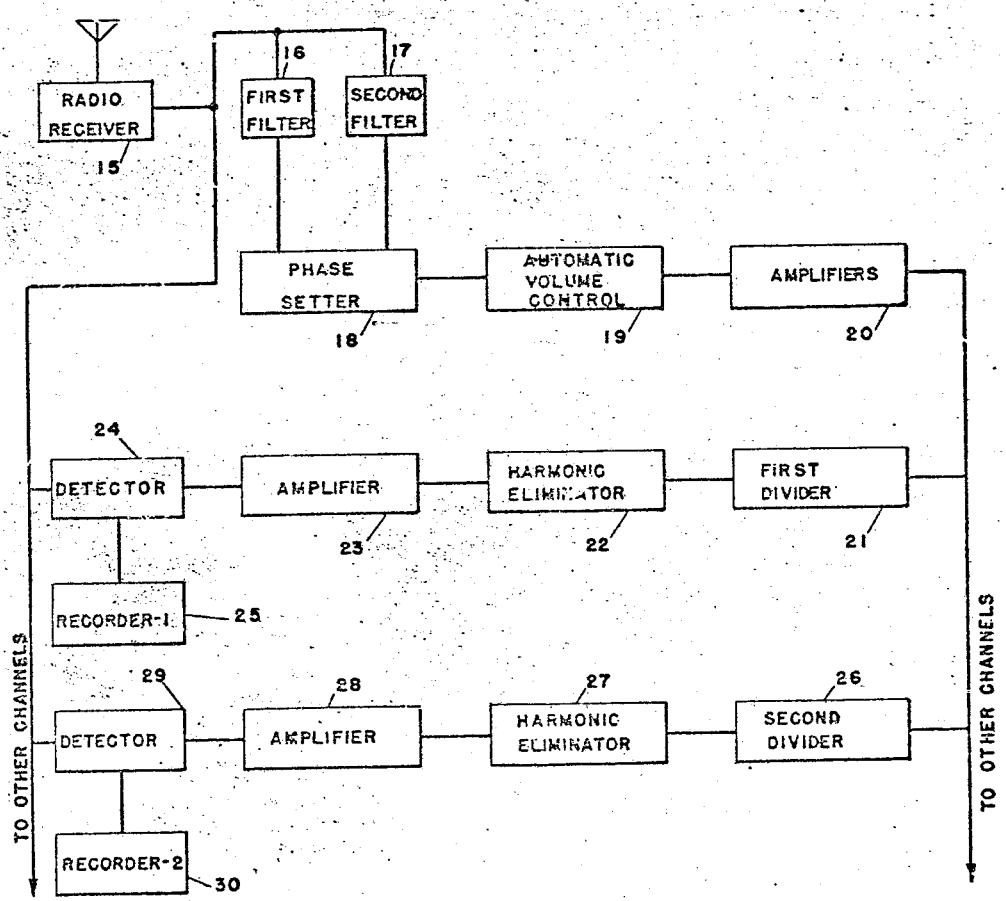
Fig. 3 illustrates in block diagram form the receiver according to the preferred embodiment of this invention.

In Fig. 1 is shown a generalized block diagram of the complete transmitter. The D. C. motor I used in the transmitting system, obtains its source of energy from the ship's battery, not shown. This motor is mechanically coupled to the phonic wheel generators 2. From these generators voltages of multiple frequency are derived and fed to the strain gage modulators 3. In conjunction with these voltages, a 500 cycle voltage is generated for the purpose of synchronizing a motor at the receiver. This frequency is used as the pilot frequency. This signal along with the voltages obtained from the strain gage modulators is fed to a mixer 4 whose output in turn modulates a radio transmitter 5. The components so far described are those of the transmitter unit installed in the plane being tested. The phonic wheel 2 may, if desired, generate signals of other frequencies than the ones indicated.

Fig. 2 illustrates a complete block diagram of the receiver-recorder. A signal radiated from the transmitter is intercepted by a radio receiver 6 having associated therewith an automatic volume control 7 and power amplifier units, not shown. The output from the radio receiver is fed to the AVC unit so that constant level signal output may be obtained. The output from the AVC unit is fed in part to a 500 cycle filter 8 for the purpose of obtaining the desired signal for driving the 500 cycle synchronous motor 9.

The energy from the filter 8 is of such small magnitude that it is necessary to increase it by means of a two-phase amplifier 10. This two-phase amplifier feeds the 500 cycle synchronous motor that is mechanically coupled to the receiver phonic wheel generators 11; the frequency output of which corresponds with the frequency output of the phonic wheel generators 2 of the transmitter. The output from each phonic wheel in the receiver-recorder is fed to one particular discriminator 12 of the group generally designated. In addition to this, the complex wave containing the intelligence from the plane is fed from the AVC unit to each discriminator 12. A recording oscillograph element 13, of the group generally designated, is connected to the output from each discriminator.

The 500 cycle signal generated by the phonic wheel generator of the receiver is connected to a phase sensitive unit 14 along with the 500 cycle signal received from the plane in order to maintain a predetermined time relationship of the D. C. motor with respect to the 500 cycle synchronous motor.

Fig. 3 illustrates a preferred embodiment of the receiver of this invention in block diagram form. This receiver is adapted to be used with a transmitter transmitting two reference frequencies, such for example, as 500 and 20,000 cycles per second. The mixed signal containing the information of all of the channels and the two reference frequencies is picked up by radio receiver 15 and delivered to the output thereof in sufficient strength for the subsequent apparatus.

The two reference frequencies are filtered from a portion of the output by the first frequency filter 16 and the second frequency filter 17. Preferably these reference frequencies are integral multiples and submultiples of all of the subcarrier frequencies utilized in the system. These reference frequencies are combined in phase setter 18 to hold the divided frequencies exactly in phase since the detectors are sensitive to a drift in phase. The output of the phase setter is controlled as to volume by automatic volume control 19 and amplified to the desired level by amplifier 20 before connection to the frequency dividers 21, 26, which may operate at frequencies of, for example, 4,000 and 10,000 cycles respectively. There are as many dividers as there are subcarrier channels, of which only two are illustrated in Fig. 3.

One subcarrier channel will be described by way of example; and referring to Fig. 3 this channel will be that of the first divider. As above mentioned the first divider 21 takes its input from amplifier 20 and delivers an output whose fundamental is the divided frequency, for example, 4,000 cycles/sec. This output is rich in harmonics, and since the detector requires a sine wave, the output passes through harmonic eliminator 22 before being amplified in amplifier 23, preparatory to its insertion into detector or discriminator 24. In this manner detector 24 at the receiver is supplied a subcarrier frequency that is an exact duplicate of the corresponding subcarrier at the transmitter. Detector 24 also receives an input of the complex wave from the receiver. Hereinafter, the signal applied to the detector of the same frequency as the subcarrier signal generated at the transmitter, and utilized for obtaining demodulation of the complex signal, is referred to as the supplied subcarrier signal. The reaction of the supplied subcarrier signal upon the complex wave resolves the modulations placed on the subcarrier at the transmitter, said modulations in turn being recorded by recorder 25.

Figure 4A:
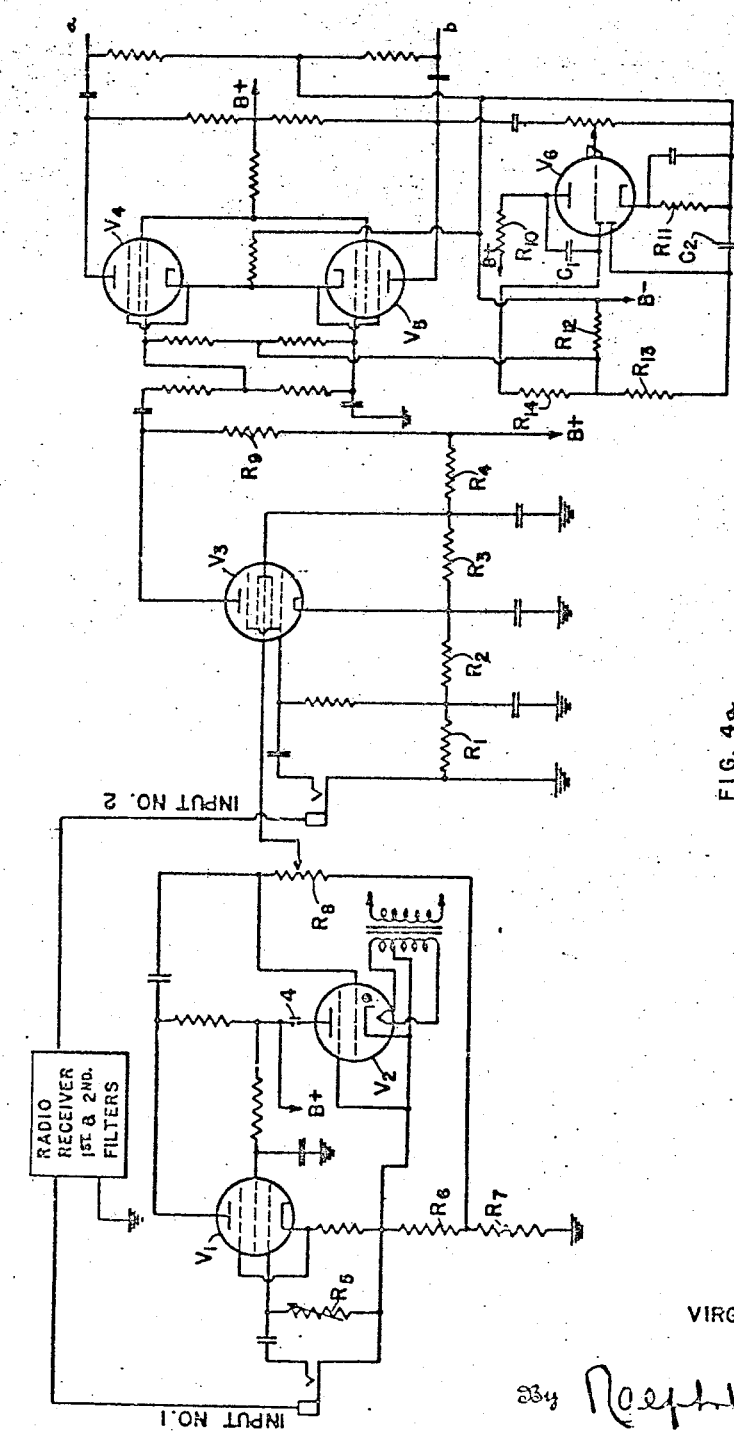

Referring to Figs. 4a, 4b, and 4c it has already been mentioned that it is necessary to the operation of the detector units to have a supplied subcarrier signal of the same frequency as the subcarrier signal at the transmitter in order to detect a particular subcarrier component in the complex wave containing the information sent down by radio from the plane. Inasmuch as the circuits are phase sensitive, it is imperative that the reference frequency utilized in the dividers for obtaining the supplied subcarrier signals be maintained at a constant phase relationship with respect to all other signal components. This multi-channel receiver system is fundamentally based upon the principle that one reference frequency generated at the transmitter be divided after reaching the receiver unit into proper integer submultiples for supplied subcarrier signals in the detector circuits. In maintaining the proper phase relationships between this reference frequency, the sub-multiple-frequency supplied subcarrier signals, and the components of subcarrier frequency in the complex wave carrying the information, it is necessary that the starting time for all the dividers to which the aforesaid reference frequency is applied be maintained for one particular phase relationship for all signal and signal components employed in the system. This starting characteristic is established by means of the circuit illustrated in block 18 and marked phase setter.

The frequencies generated at the transmitter consist of the aforementioned reference frequencies and the subcarrier frequencies which contain the desired information. Upon receiving these mixed signals at the receiver, the complex wave is passed through the two-band pass filters 16 and 17, Fig. 3, which separate the two reference frequencies of 500 and 20,000 cycles from the complex wave for insertion into the two corresponding input channels 1 and 2, Fig. 4a. The remaining subcarriers containing the information are injected in the output channel 3, Fig. 4c.

Referring now particularly to Fig. 4a, tube $V_3$ is initially blocked from conducting by means of the high negative bias voltage imposed on the control grid by the voltage divider circuit composed of resistors $R_1$, $R_2$, $R_3$ and $R_4$. After the phase setting apparatus has warmed sufficiently, the time delay relay 4 closes and connects the B+ voltage to the plate of the thyratron $V_2$. However, due to the fact that the first reference frequency signal of 500 cycles connected to the control grid of tube $V_1$ has been eliminated from the remainder of the circuit by setting variable resistor $R_5$ at zero resistance, no signal current flows in the plate circuit of tube $V_1$. Thus, the control grid of tube $V_2$ remains biased sufficiently negative to keep tube $V_2$ from tripping. The bias voltage for $V_2$ is obtained by means of the voltage drop across resistor $R_6$. The voltage drop across resistor $R_7$ is at this time not sufficient to make tube $V_3$ conducting. However, at the desired time for operation the effective resistance of $R_5$ is manually increased, thus introducing a signal in the control grid of $V_1$ which correspondingly introduces a signal across potentiometer $R_3$ of such a nature that the bias voltage on $V_2$ is reduced to its critical firing voltage. This enables that tube to conduct and increase the current flow through resistors $R_6$ and $R_7$ to the extent that the corresponding voltage drop across $R_7$ is increased sufficiently to permit tube $V_3$ to conduct. With this tube in operation, the second reference frequency of 20,000 cycles is allowed to pass through this tube and develops a corresponding signal voltage across the plate resistor R₉. The reference signal has thus been properly synchronized for the starting operation of the receiver unit, and the dividers start "counting" only at the proper time for correct phase relation with the transmitter.

Upon the introduction of this voltage from the V₃ into the automatic volume control, which comprises the tubes V₄, V₅ and V₆ and associated components, Fig. 4a, a portion of the signal after passing through variable mu tubes V₄ and V₅ is introduced into the control grid of tube V₆ which is a triode-diode. The triode section of this tube functions primarily to amplify as well as phase invert the signal. The signal voltage obtained from the plate resistor R₁₀ is then passed through the plate coupling condenser C₁ or C₂ depending upon the phase of the applied signal, and this circuit in turn is completed by passage of the rectified current through resistors R₁₁, R₁₂, and either R₁₃ or R₁₄. The current passing through resistor R₁₂ is then of a rectified nature and of proper phase relationship to produce a D. C. bias voltage in opposition to either an increase or decrease of signal input. It might be further pointed out that a more delayed automatic volume control action can be obtained by paralleling a condenser across the resistor R₁₂.

This constant level signal is then applied to amplifier 20, containing tube V₇ and associated components, Fig. 4b, and is amplified to a level sufficient for injection into the divider circuits.

In the frequency divider 21, the reference frequency of 20,000 cycles is divided to the repetition frequency of the particular subcarrier, for example, 4000 cycles. Until recently the circuits used most commonly as frequency dividers were oscillatory circuits having a natural period somewhat longer than that of the frequency desired at the output of the divider. The input wave whose frequency was to be divided, acted to cause the oscillatory circuit to start a new cycle of operation after a given number of cycles of the original wave has elapsed. Such divider circuits use gaseous discharge tubes, multivibrator stages, or blocking oscillators.

In some applications the dividers of the prior art were not satisfactory because of inability due to fluctuations in supply voltages, or due to changes in tube characteristics. This was especially true if the divisor was large. They were particularly troublesome if the input frequency was not fixed, for if the input frequency varied an appreciable amount the divider circuit would become unstable or would divide by a different amount than was desired.

The frequency divider of this invention, Fig. 4b, is extremely stable for counts up to sixteen and higher, and the input frequency can be varied over a ten to one range or more without changing the count or divisor.

The counter circuit counts a given number of pulses without regard to their frequency and fires to produce a single pulse after the required number of pulses have occurred. The counting is accomplished by charging a condenser in a stairstep fashion.

The voltage across this condenser is applied to a trigger circuit that trips at a predetermined voltage level. Upon tripping, the trigger circuit in a very brief interval of time discharges the condenser, creates an impulse which serves as the output voltage from the divider, and prepares itself to stand by until the condenser voltage again reaches the critical value. For every cycle of the input frequency one step is produced and the number of steps that will occur before the trigger circuit trips will depend upon the size of the risers on these steps and upon the critical voltage of the trigger circuit. The length of the tread on these steps is determined by the input frequency and has no influence on the action of the trigger circuit.

For best results the input wave to the counter circuit should be of rectangular form. This is generally accomplished in the aforementioned amplifier, which in this case would be a square wave amplifier. The voltage from the square wave amplifier is applied to the series combination of the condensers C₃ and C₄, and the diode V₈. When the square wave amplifier output is changing in the positive direction, a charging current flows through this series combination. This current charges the condensers so that the peak voltage is divided between them inversely as their respective capacitances. C₃ is usually small compared to C₄ so that the voltage across C₄ will be small compared to the peak value of the applied signal. This action produces the riser on the first step in the stairstep voltage across C₄.

As was stated before, the number of steps that will occur before the trigger circuit trips depends upon the size of the risers on these steps and the critical voltage of the trigger circuit. The size of the risers will depend upon the peak to peak value of the rectangular voltage wave and the ratio of C₃ to C₄. The critical voltage of the trigger circuit depends upon the bias on the trigger tube. Therefore, for a given square wave amplifier operation C₃ or C₄ may be adjusted to change the count or divisor of the circuit, or the bias on the trigger tube may be changed. In some cases it will be found desirable to make C₃ adjustable to give large changes in count and a bias adjustment can be used for minor adjustment or calibration.

The trigger tube V₉ shown in the divider, Fig. 4b, may be in the same envelope with the output amplifier tube. It is of the blocking oscillator type, and it may be of the multivibrator type. The grid of the trigger tube has no D. C. path to ground except what may be present in the form of leakage resistance, so the trigger tube is not self-oscillatory except over long periods of time due to leakage resistance. The choice of value in C₄ will determine the time constant for the particular leakage resistance and will limit the low frequency output of the frequency divider. The period of oscillation may readily be in the order of 15 seconds and is of no particular concern except where very low frequencies are involved. If the time constant of this circuit is too low for the frequencies involved it will show up in the stairstep voltage wave across C₄ by a downward slant of the treads on the steps. The downward slope becomes increasingly large as the number of steps is increased so that there is a tendency toward instability for large counts as the net gain for a given step high on the stairs will be small because of a loss of voltage in the tread. This nearly equals or may exceed the rise in voltage on the riser. Such a condition is easily diagnosed with an oscilloscope. For best results the tread should be horizontal and the risers nearly vertical. In order that the risers may be nearly vertical the time constant of the circuit in which C₃ and C₄ are charged must be considered. The effective resistance-capacity of this circuit should be so low that the time constant is negligible compared to the time of a period $1/f$. If this time constant is not negligibly small the riser takes on a curved shape, producing rounded steps instead of square steps and the critical voltage might be reached on the rounded portion of this riser to produce a trigger action at a variable time, depending upon certain variations in the circuit. The period of the output of the frequency divider would, therefore, be variable which is not strictly an integral submultiple of the input.

By taking the proper precautions it is possible to make the dividing factor of the frequency divider quite large, that is, something in the order of 60. Ordinarily, a count of 8 or 16 is as high as it is usually desirable to go with one stage of division, especially since it is so easy to cascade divider circuits and thereby multiply the count or dividing number.

A jack 31 is connected into the output circuit of the divider circuit for testing purposes.

As previously pointed out, it is desirable to apply a sine wave to the detector unit. Inasmuch as the wave from the divider circuit contains many harmonics, the sine wave is obtained by passing the complex signal through the Harmonic Eliminator 22, which may comprise the L-C network shown, Fig. 4b, or a low pass filter whose cut-off characteristic is between the first and second harmonic. The level of the signal upon leaving the harmonic eliminator is too low for operation in the detector unit, and it is necessary at this time to increase the level of the signal by passing it through amplifier 23, which may comprise the circuit of tube $V_{10}$ and associated components, Fig. 4b. This supplied subcarrier signal is then applied by way of lead C to the detector across resistor $R_{15}$, Fig. 4c, and the complex wave containing the information on the subcarrier frequency is then applied to the detector through the coupling transformer $T_1$, to the control grids of the detector tubes $V_{11}$ and $V_{12}$. The functioning of the detector is such that the information contained in the subcarrier frequency corresponding to the frequency obtained from the divider unit appears in the output of tubes $V_{11}$ and $V_{12}$, and it is indicated on the 500 micro-ampere instrument, and recorded in the recorder unit. Filters may be provided, if desired, between tubes $V_{11}$ and $V_{12}$ and the recorders.

Exemplary values for the circuit elements are given in the following table:

Table

| | |
|---|---|
| $V_1$,6AC7 | $R_5$,750K |
| $V_2$,2050 | $R_6$,4125K |
| $V_3$,6L7 | $R_7$,375 |
| $V_4$,6SK7 | $R_8$,250K |
| $V_5$,6SK7 | $R_9$,27K |
| $V_6$,R7 | $R_{10}$,25K |
| $V_7$,6SJ7 | $R_{11}$,2.2K |
| $V_8$,6H6 | $R_{12}$,3 meg. |
| $V_9$,6SN7 | $R_{13}$,100K |
| $V_{10}$,6SN7 | $R_{14}$,100K |
| $V_{11}$,6F6 | $R_{15}$,2-250K |
| $V_{12}$,6F6 | $C_1$,.005 |
| $R_1$,350 | $C_2$,.005 |
| $R_2$,33 | $C_3$,.00025 |
| $R_3$,2K | $C_4$,.005 |
| $R_4$,4.5K | T,transformer |

A more detailed disclosure of a suitable detector is found in application Ser. No. 593,605, Virgil H. Disney, filed May 14, 1945, for Discriminator Circuit.

Obviously many modifications and variations of the present invention are possible in the light of the above teachings. It is therefore to be understood that within the scope of the appended claims the invention may be practiced otherwise than as specifically described.

What is claimed is:

1. Receiver apparatus for use in a telemetering system of the type in which a radio wave and a plurality of A.-C. signals are generated at a transmitter station, two of said signals being of two reference frequencies respectively, other of said signals being subcarrier signals of subcarrier frequencies respectively, said subcarrier signals being modulated in accordance with variations in a plurality of quantities to be measured respectively thereby to provide a plurality of subcarrier signals having a plurality of modulation components respectively, all said signals being utilized to modulate said radio wave, said receiving apparatus comprising radio receiving means adapted to receive said wave and to supply a complex A.-C. receiver signal containing all said reference and subcarrier frequencies and said variations as components thereof, filter means operatively connected to said receiving means for obtaining from the receiver signal two A.-C. reference signals of said two reference frequencies respectively, phase setter means operatively connected to said filter means, amplifier means energized from said phase setter means, said phase setter means being constructed and arranged for utilizing one of said reference signals to control the phase of the other of said reference signals, said other reference signal being applied to said amplifier means in predetermined phase relationship to said complex A.-C. signal, a plurality of frequency divider means energized from said amplifier means, said plurality of frequency divider means each including a counter circuit and being constructed and arranged to provide a plurality of supplied subcarrier signals of frequencies corresponding respectively to the frequencies of the subcarrier signals at the transmitter station, a plurality of discriminator means, each of said discriminator means including a pair of similar electron discharge amplifier tubes each having a control grid, said pair of electron discharge tubes having one of said supplied subcarrier signals applied to said control grids in phase, said complex wave being applied to said control grids in phase opposition, said plurality of discriminator means being constructed and arranged to separate the plurality of modulation components respectively from the complex signal, and a plurality of indicating means operatively connected to said plurality of discriminator means respectively and constructed and arranged to indicate variations in said modulation components.

2. Receiver apparatus for use in a telemetering system of the type in which a radio wave and a plurality of A.-C. signals are generated at a transmitter station, two of said signals being of two reference frequencies respectively, other of said signals being subcarrier signals of subcarrier frequencies respectively, said subcarrier signals being modulated in accordance with variations in a plurality of quantities to be measured respectively thereby to provide a plurality of subcarrier signals having a plurality of modulation components respectively, all said signals being utilized to modulate said radio wave, said receiver apparatus comprising radio receiving means adapted to receive said wave and to supply a complex A.-C. receiver signal containing all said reference and subcarrier frequencies and said variations as components thereof, filter means operatively connected to said receiving means for obtaining from the receiver signal two A.-C. reference signals of said two reference frequencies respectively, phase setter means operatively connected to said filter means, amplifier means energized from said phase setter means, said phase setter means being constructed and arranged for utilizing one of said reference signals to control the phase of the other of said reference signals, said other reference signal being applied to said amplifier means in predetermined phase relationship to said complex A.-C. signal, a plurality of frequency divider means energized from said amplifier means, said plurality of frequency divider means each including a counter circuit and being constructed and arranged to provide a plurality of supplied subcarrier signals of frequencies corresponding respectively to the frequencies of the subcarrier signals at the transmitter station, a plurality of discriminator means, each of said discriminator means including a pair of similar electron discharge amplifier tubes each having a control grid, anode, and cathode, said cathodes being connected together, transformer means for applying said complex signal in phase opposition to said control grids, a supplied subcarrier signal being applied in phase between both said control grids and both said cathodes, and indicator means operatively connected to said anodes and cathodes, said plurality of discriminator means being constructed and arranged to separate said plurality of modulation components respectively from said complex signal, each of said indicator means being adapted to indicate variations in a different one of said plurality of modulation components.

3. Receiver apparatus for use in a telemetering system of the type in which a radio wave and a plurality of A.-C. signals are generated at a transmitter station, two of said signals being of two reference frequencies respectively, other of said signals being subcarrier signals of subcarrier frequencies respectively, said signals of subcarrier frequencies being modulated in accordance with variations in a plurality of quantities to be measured respectively thereby to provide subcarrier signals having a plurality of modulation components respectively, all said signals being utilized to modulate said radio wave, said receiving apparatus comprising radio receiving means adapted to receive said wave and to supply a complex A.-C. receiver signal containing all said reference and subcarrier frequencies and said variations as components thereof, filter means operatively connected to said receiving means for obtaining from the receiver signal two A.-C. reference signals of said two reference frequencies respectively, phase setter means operatively connected to said filter means, amplifier means energized from said phase setter means, said phase setter means being constructed and arranged for utilizing one of said reference signals to control the phase of the other of said reference signals, said other reference signal being applied to said amplifier means in predetermined time relationship to said complex A.-C. signal, a plurality of frequency divider means energized from said amplifier means, said plurality of frequency divider means each including a counter circuit and being constructed and arranged to provide a plurality of supplied subcarrier signals of frequencies corresponding respectively to the subcarrier frequencies at the transmitter, a plurality of means operatively connected to said last named means and to said receiver means for utilizing said plurality of supplied subcarrier signals for separating said plurality of modulation components respectively, and a plurality of recording means operatively connected to said last named means respectively for recording variations in said modulation components respectively.

4. Receiver apparatus for use in a telemetering system of the type in which a radio wave and a plurality of A.-C. signals are generated at a transmitter station, two of said signals being of two reference frequencies respectively, other of said signals being subcarrier signals of subcarrier frequencies respectively, said subcarrier signals being modulated in accordance with variations in a plurality of quantities to be measured thereby to provide a plurality of subcarrier signals having a plurality of modulation components respectively, all said signals being utilized to modulate said radio wave, said receiving apparatus comprising radio receiving means for receiving said wave and adapted to supply a complex A.-C. receiver signal containing all said reference and subcarrier frequencies and said variations as components thereof, filter means operatively connected to said receiving means for obtaining from the receiver signal two A.-C. reference signals of said two reference frequencies respectively, phase setter means operatively connected to said filter means to be energized therefrom, amplifier means energized from said phase setter means, said phase setter means being constructed and arranged for utilizing one of said reference signals to control the phase of the other of said reference signals, said other reference signal being applied to said amplifier means in predetermined phase relationship to said complex A.-C. signal, a plurality of frequency divider means energized from said amplifier means and adapted to provide a plurality of supplied subcarrier signals of frequencies corresponding respectively to the frequencies of the subcarrier signals at the transmitter station, a plurality of discriminator means having said complex receiver signal applied thereto and said plurality of supplied subcarrier signals applied thereto respectively, said discriminator means being constructed and arranged to separate said modulation components respectively from the complex signal, and a plurality of indicating means operatively connected to said plurality of discriminator means respectively and constructed and arranged to indicate variations in said modulation components.

5. Receiver apparatus for use in a telemetering system of the type in which a radio wave and a plurality of A.-C. signals are generated at a transmitter station, two of said signals being of two reference frequencies respectively, other of said signals being signals of subcarrier frequencies respectively, said subcarrier signals being modulated in accordance with variations in a plurality of quantities to be measured respectively thereby to provide a plurality of subcarrier signals having a plurality of modulation components respectively, all of said signals being utilized to modulate said radio wave, said receiving apparatus comprising radio receiving means adapted to receive said wave and supply a complex A.-C. receiver signal containing all said reference and subcarrier frequencies and said variations as components thereof, band-pass filter means operatively connected to said receiving means for obtaining from the receiver signal two A.-C. reference signals of said two reference frequencies respectively, phase setter means operatively connected to said filter means to be energized therefrom, amplifier means energized from said phase setter means, said phase setter means including two electron discharge tube means having said two reference signals applied thereto respectively, one of said electron discharge tube means being adapted to control the instant when the other discharge tube means becomes operative thereby to control the phase of the reference signal applied to said amplifier means, a plurality of frequency divider means energized from said amplifier means, each of said divider means including means for counting the cycles of said last named reference signal and generating a supplied subcarrier signal having a frequency which is an integral submultiple of the frequency of the last named reference signal, a plurality of means including L.-C. networks for eliminating undesirable harmonic and subharmonic components from the supplied subcarrier signals respectively, a plurality of discriminator means having said complex receiver signal applied thereto and said supplied subcarrier signals applied thereto respectively, said discriminator means being constructed and arranged to separate said modulation components respectively from the complex signal, and a plurality of indicating means operatively connected to said plurality of discriminator means respectively and constructed and arranged to indicate variations in said modulation components.

6. Receiver apparatus for use in a telemetering system of the type in which a radio wave and a plurality of A.-C. signals are generated at a transmitter station, two of said signals being of two reference frequencies respectively, other of said signals being subcarrier signals of subcarrier frequencies respectively, said subcarrier signals being modulated in accordance with variations in a plurality of quantities to be measured respectively thereby to provide a plurality of subcarrier signals having a plurality of modulation components respectively, all said signals being utilized to modulate said radio wave, said receiving apparatus comprising radio receiving means adapted to receive said wave and to supply a complex A.-C. receiver signal containing all said reference and subcarrier frequencies and said variations as components thereof, filter means operatively connected to said receiving means for obtaining from the receiver signal two A.-C. reference signals of said two reference frequencies respectively, phase setter means operatively connected to said filter means, said phase setter means including a pair of electron discharge tube amplifiers connected to be energized by said pair of reference signals respectively, one of said amplifiers being adapted to control the operation of the other, the other of said amplifiers having the higher frequency of said reference signals applied thereto, amplifier means energized by the signal from said other amplifier, a plurality of frequency divider means energized from said amplifier means, each of said plurality of divider means including a counter circuit and adapted to provide a supplied subcarrier signal of a frequency corresponding to a different one of the subcarrier signals at the transmitter, a plurality of discriminator means having said complex receiver signal applied thereto and the supplied subcarrier signals applied thereto respectively, said plurality of discriminator means being constructed and arranged to separate said plurality of modulation components respectively from the complex signal, and a plurality of indicating means operatively connected to said plurality of discriminator means respectively and constructed and arranged to indicate variations in said plurality of modulation components.

7. Receiver apparatus for use in a telemetering system of the type in which a radio wave and a plurality of A.-C. signals are generated at a transmitter station, two of said signals being of two reference frequencies respectively, other of said signals being subcarrier signals of subcarrier frequencies respectively, said subcarrier signals being modulated in accordance with variations in a plurality of quantities to be measured respectively thereby to provide subcarrier signals having a plurality of modulation components respectively, all said signals being utilized to modulate said radio wave, said receiver apparatus comprising radio receiving means adapted to receive said wave and to supply a complex A.-C. receiver signal containing all said reference and subcarrier frequencies and said variations as components thereof, filter means operatively connected to said receiving means for obtaining from the receiver signal two A.-C. reference signals of said two reference frequencies respectively, means operatively connected to said filter means for utilizing said reference signals to obtain a plurality of supplied subcarrier signals having frequencies corresponding respectively to the frequencies of the subcarrier signals, a plurality of discriminator means having said plurality of supplied subcarrier signals applied thereto respectively, all said plurality of discriminator means having said complex receiver signal applied thereto, said plurality of discriminator means being constructed and arranged to separate the plurality of modulation components respectively, and a plurality of recording means operatively connected to said plurality of discriminator means for respectively recording said plurality of modulation components thereby to record variations in the quantities to be measured.

VIRGIL H. DISNEY.

REFERENCES CITED

The following references are of record in the file of this patent:

UNITED STATES PATENTS

| Number | Name | Date |
| --- | --- | --- |
| 1,562,965 | Horton | Nov. 24, 1925 |
| 1,577,722 | Horton | Mar. 23, 1926 |
| 2,426,778 | Long | Sept. 2, 1942 |